(12) United States Patent
Whitaker

(10) Patent No.: US 9,001,864 B2
(45) Date of Patent: Apr. 7, 2015

(54) APPARATUS AND METHOD FOR PRODUCING OR REPRODUCING A COMPLEX WAVEFORM OVER A WIDE FREQUENCY RANGE WHILE MINIMIZING DEGRADATION AND NUMBER OF DISCRETE EMITTERS

(71) Applicant: George Whitaker, Bloomington, IN (US)

(72) Inventor: George Whitaker, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 54 days.

(21) Appl. No.: 14/052,238

(22) Filed: Oct. 11, 2013

(65) Prior Publication Data

US 2014/0177679 A1    Jun. 26, 2014

Related U.S. Application Data

(60) Provisional application No. 61/713,675, filed on Oct. 15, 2012.

(51) Int. Cl.
*H04B 1/69* (2011.01)
*H04L 27/00* (2006.01)

(52) U.S. Cl.
CPC ................................. *H04L 27/0004* (2013.01)

(58) Field of Classification Search
USPC ......................................................... 375/139
See application file for complete search history.

(56) References Cited

U.S. PATENT DOCUMENTS

| 3,644,807 A * | 2/1972 | Zajac ....................... 318/400.05 |
| 5,619,998 A * | 4/1997 | Abdel-Malek et al. ........ 600/437 |
| 6,370,170 B1 * | 4/2002 | Glance ............................. 372/32 |
| 6,940,893 B1 * | 9/2005 | Pinkney et al. ............... 375/139 |
| 2006/0123914 A1 * | 6/2006 | Pena et al. ....................... 73/629 |
| 2010/0017205 A1 * | 1/2010 | Visser et al. ................... 704/225 |

OTHER PUBLICATIONS

Agilent Technologies Inc., "Radar Emitter Simulation", Aerospace Defense Symposium, Agilent Technologies, 2002—Internet Citation.*

* cited by examiner

*Primary Examiner* — Daniel Washburn
*Assistant Examiner* — Berhanu Tadese
(74) *Attorney, Agent, or Firm* — Christopher A. Monsey

(57) ABSTRACT

An apparatus and method for signal emitters determining and using a reduced number of discrete frequency transmitters based on frequency segmentation and degradation analysis of a candidate filter configuration compared to an original waveform input signal for acceptability determination in view of desired system parameters. A method that configures a device to produce a complex waveform over a desired range of frequencies is provided. Configuring a device can include filtering to reduce a number of frequencies which in turn is used to reduce signal emitters and configuring resulting reduced signal emitters includes producing a desired complex waveform over a desired range of frequencies.

20 Claims, 13 Drawing Sheets

| Fmax | 10000 | | Wavelet Transform | | | | |
|---|---|---|---|---|---|---|---|
| delta t | 0.0002 | Signal | | | | | |
| F | 1250 | | | | | | |
| t | w | F(x)=sinx/x | 1st pass | 2nd pass | 3rd pass | 4th pass | |
| 0 | 7853.982 | 0 | 0.31831 | 0.106103 | 0.057599 | 0.030011 | |
| 0.0002 | 7853.982 | 0.63661977 | -0.1061 | 0.009095 | 0.002424 | -0.02759 | |
| 0.0004 | 7853.982 | -1.024E-16 | 0.063662 | 0.003215 | -0.0485 | -0.0485 | |
| 0.0006 | 7853.982 | -0.2122066 | -0.04547 | 0.001632 | -0.00079 | -0.00079 | |
| 0.0008 | 7853.982 | 1.0236E-16 | 0.035368 | -0.21221 | -0.21221 | -0.21221 | |
| 0.001 | 7853.982 | 0.12732395 | -0.02894 | -0.05457 | -0.05457 | -0.05457 | |
| 0.0012 | 7853.982 | -1.495E-16 | 0.024485 | -0.03215 | -0.03215 | -0.03215 | |
| 0.0014 | 7853.982 | -0.0909457 | -0.02122 | -0.02285 | -0.02285 | -0.02285 | |
| 0.0016 | 7853.982 | 1.0236E-16 | 0.31831 | 0.31831 | 0.31831 | 0.31831 | |
| 0.0018 | 7853.982 | 0.07073553 | -0.1061 | -0.1061 | -0.1061 | -0.1061 | |
| 0.002 | 7853.982 | -1.872E-16 | 0.063662 | 0.063662 | 0.063662 | 0.063662 | |
| 0.0022 | 7853.982 | -0.0578745 | -0.04547 | -0.04547 | -0.04547 | -0.04547 | |
| 0.0024 | 7853.982 | 3.3796E-16 | 0.035368 | 0.035368 | 0.035368 | 0.035368 | |
| 0.0026 | 7853.982 | 0.04897075 | -0.02894 | -0.02894 | -0.02894 | -0.02894 | |
| 0.0028 | 7853.982 | -2.841E-16 | 0.024485 | 0.024485 | 0.024485 | 0.024485 | |
| 0.003 | 7853.982 | -0.0424413 | -0.02122 | -0.02122 | -0.02122 | -0.02122 | |
| 0.0032 | 7853.982 | 2.4372E-16 | | | | | |

Fig. 2

| Wavelet | Frequency | 1st pass | 2nd pass | 3rd pass | 4th pass |
|---|---|---|---|---|---|
| 0.030011 | DC | 0.057599 | 0.106103 | 0.31831 | 0 |
| -0.02759 | 312.5Hz | 0.002424 | 0.009095 | -0.1061 | 0.63662 |
| -0.0485 | 625Hz | -0.0485 | 0.003215 | 0.063662 | -1.1E-16 |
| -0.00079 | 625Hz | -0.00079 | 0.001632 | -0.04547 | -0.21221 |
| -0.21221 | 1.25KHz | -0.21221 | -0.21221 | 0.035368 | 0 |
| -0.05457 | 1.25KHz | -0.05457 | -0.05457 | -0.02894 | 0.127324 |
| -0.03215 | 1.25KHz | -0.03215 | -0.03215 | 0.024485 | -1.6E-16 |
| -0.02285 | 1.25KHz | -0.02285 | -0.02285 | -0.02122 | -0.09095 |
| 0.31831 | 2.5KHz | 0.31831 | 0.31831 | 0.31831 | 1.04E-16 |
| -0.1061 | 2.5KHz | -0.1061 | -0.1061 | -0.1061 | 0.070736 |
| 0.063662 | 2.5KHz | 0.063662 | 0.063662 | 0.063662 | -1.9E-16 |
| -0.04547 | 2.5KHz | -0.04547 | -0.04547 | -0.04547 | -0.05787 |
| 0.035368 | 2.5KHz | 0.035368 | 0.035368 | 0.035368 | 3.4E-16 |
| -0.02894 | 2.5KHz | -0.02894 | -0.02894 | -0.02894 | 0.048971 |
| 0.024485 | 2.5KHz | 0.024485 | 0.024485 | 0.024485 | -2.8E-16 |
| -0.02122 | 2.5KHz | -0.02122 | -0.02122 | -0.02122 | -0.04244 |

Fig. 3

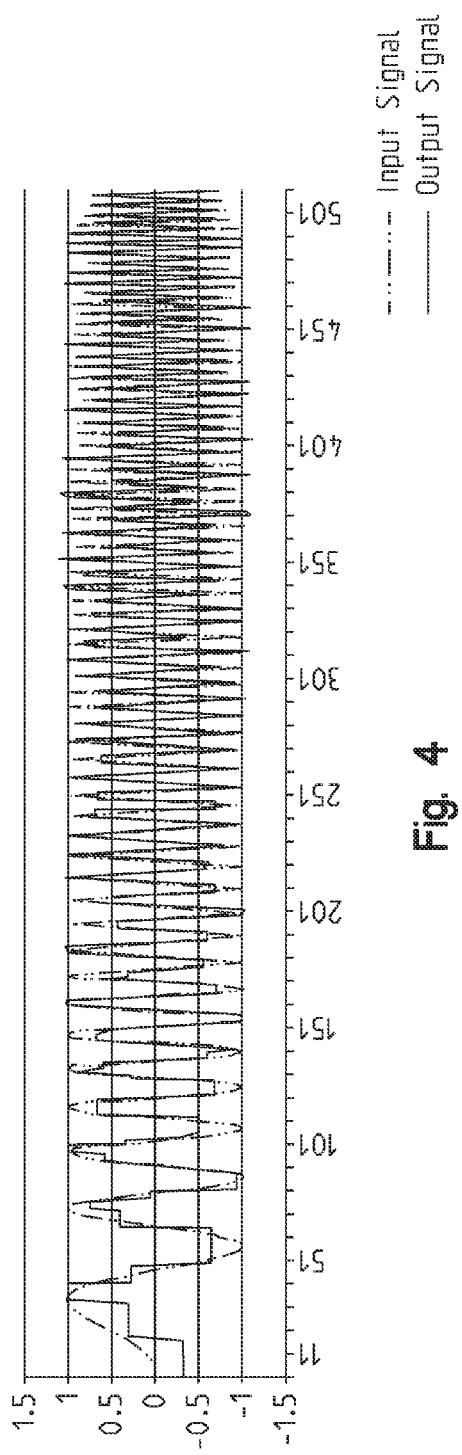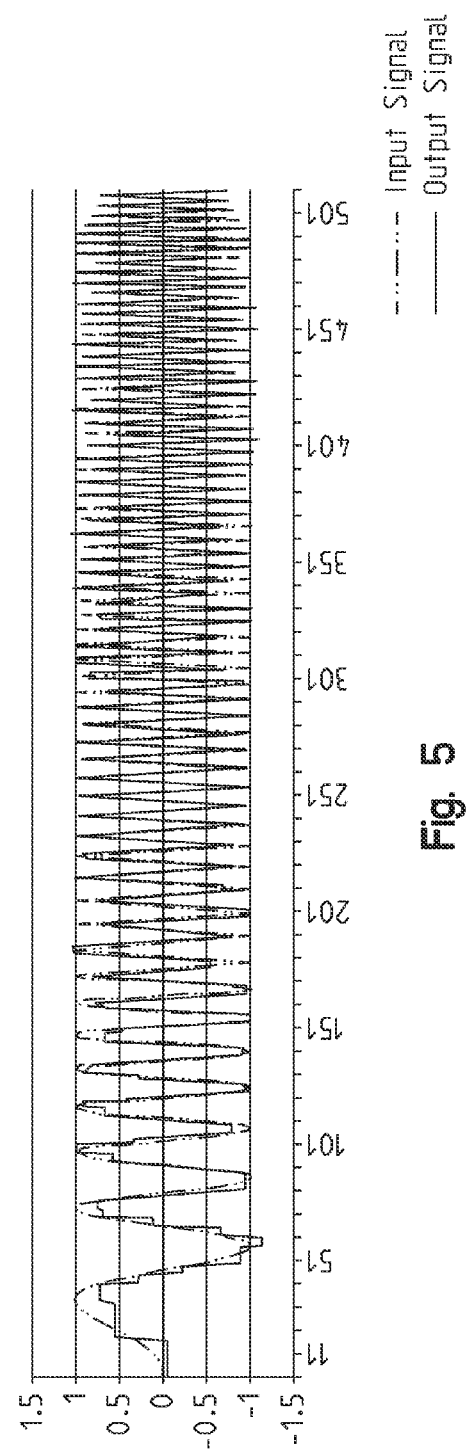

APPARATUS AND METHOD FOR PRODUCING OR REPRODUCING A COMPLEX WAVEFORM OVER A WIDE FREQUENCY RANGE WHILE MINIMIZING DEGRADATION AND NUMBER OF DISCRETE EMITTERS

CROSS-REFERENCE TO RELATED APPLICATIONS

The present application claims priority to U.S. Provisional Patent Application Ser. No. 61/713,675, filed Oct. 15, 2012, entitled "USE OF WAVELET TRANSFORMS TO PRODUCE COMPLEX WAVEFORMS FROM A REDUCED NUMBER OF DISCRETE FREQUENCY TRANSMITTERS," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used licensed by or for the United States Government for any governmental purpose without payment of any royalties thereon.

BACKGROUND AND SUMMARY OF THE INVENTION

This invention relates to an apparatus and method for producing or reproducing a complex waveform over a wide frequency range while minimizing degradation and number of discrete emitters. For example, an embodiment can include a method of using wavelet transforms filtered in the wavelet domain to produce or reproduce a complex waveform over a wide frequency range while minimizing the number of discrete transponders required. Presently, there does not exist a cheap emitter or transponder that can efficiently produce or reproduce a wave based complex waveform output such as, e.g., an acoustic complex waveforms that range from the sonic to the high ultrasonic such as outputs ranging over 10 octaves. For sonic and ultrasonic devices, efficient transducers selection can be based on both cost and power are piezoelectric devices. However a typical piezoelectric device works efficiently at only 1 to 4 octaves above or below its designed operating point at lower audio frequencies and less than 1 octave above and below its design point at the higher ultra-sonic frequencies. This concept can also be extended to Radio Frequencies (RF) and other radiated energy bands in additional embodiments.

One embodiment of the invention includes use of one or more piezoelectric devices adapted to be driven by a wavelet transform that produces coefficients that are producible by digital circuits. By combining these wavelet coefficients an original signal is reproduced. By filtering in the wavelet domain, the number of transducers required to approximate the original signal to within the desired tolerances can be reduced.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 2 shows a table describing some data results from a system in accordance with one embodiment of the invention that develops a low resolution 16 point ($2^4$) wavelet transform of sin x/x showing how results of a wavelet and inverse wavelet transforms without filtering are calculated and saved into a table;

FIG. 3 shows a table describing some data results from a system in accordance with one embodiment of the invention develops a 512 point (29) wavelet transform of a chirp signal with examples of filtering techniques used in a wavelet domain are calculated and saved into a table;

FIG. 4 shows waveform comparison results between an input waveform and a filtered output waveform (e.g., frequency bin selections and removals) with different values used to graphically show degradation analysis through a graphical display of degree of differences between the two waveforms;

FIG. 5 shows waveform comparison results between an input waveform and a different filtered output waveform (e.g., frequency bin selections and removals) with different values used to graphically show degradation analysis through a graphical display of degree of differences between the two waveforms;

FIG. 7 shows a table displaying a filtering result associated with a single frequency bin data output created from part of a wavelet transform process in accordance with an exemplary embodiment of the present invention;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

An embodiment of the invention utilizes an apparatus and method employing wavelet transforms. An engineer can create complex waveforms using just a few discrete frequencies using one aspect of the invention herein which has embodiments which use wavelet transforms.

Figure 1A:
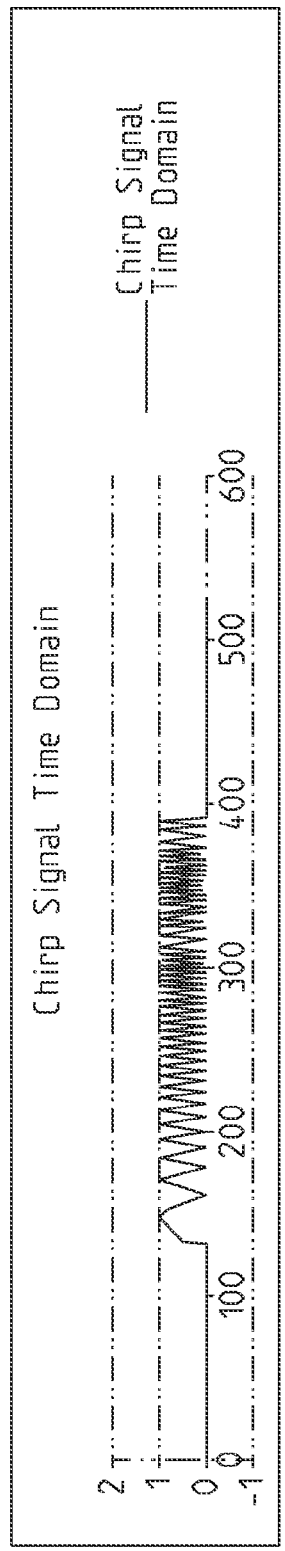
FIG. 1A shows a time domain chirp signal that spans one example of a broad band signal or broad frequency range.
Figure 1B:
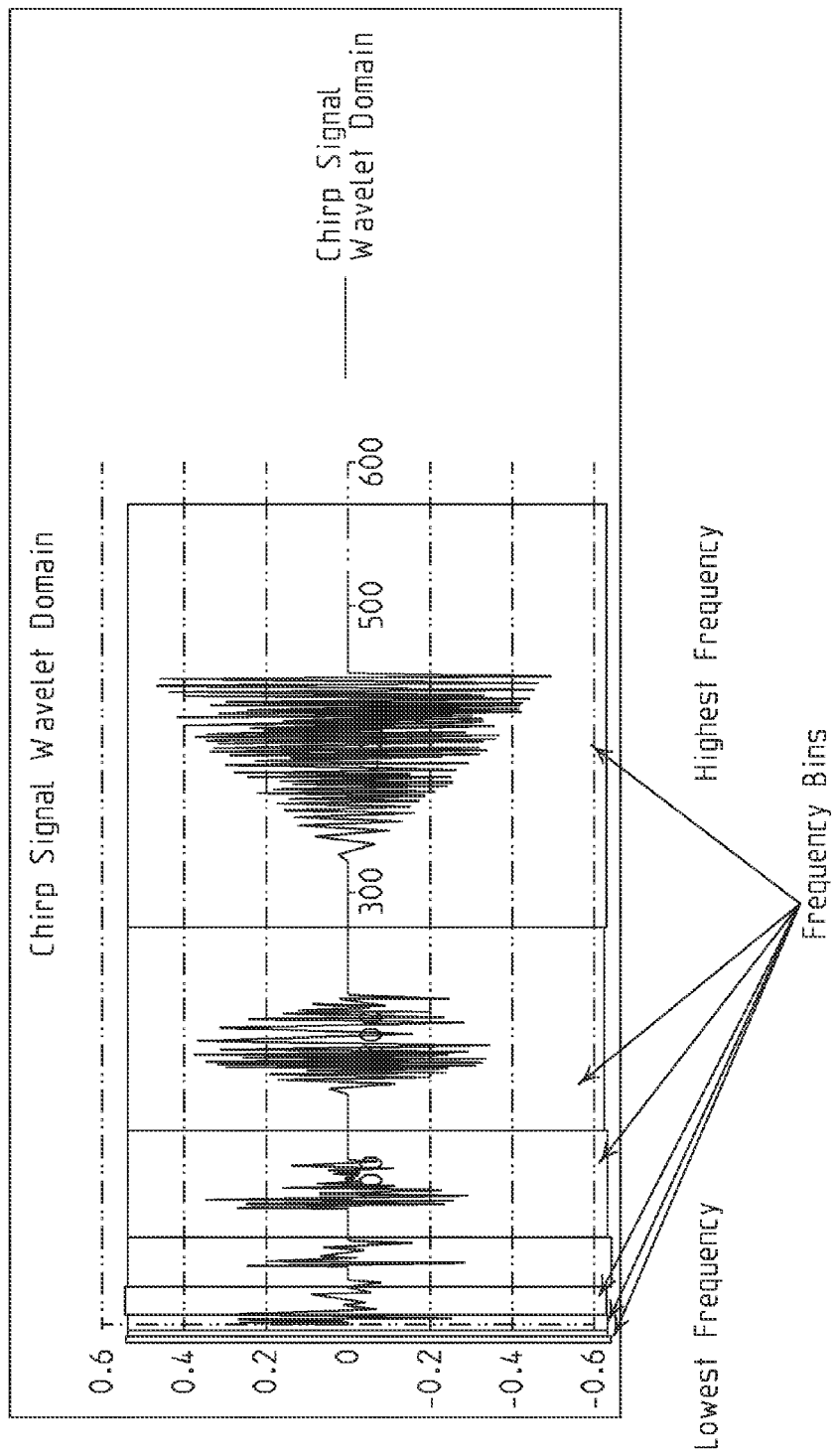
FIG. 1B shows wavelet domain signals with frequency bins for different FIG. 1A signal groups in the wavelet domain.

FIG. 1A shows a time domain chirp signal that spans one example of a broad frequency range, e.g., sonic to high ultrasonic (e.g., 10 Khz to 1.2 Mhz). FIG. 1B shows wavelet domain signals with frequency bins for different FIG. 1A signal groups in the wavelet domain. FIG. 1B shows the chip signal of FIG. 1A in a wavelet domain. FIG. 1B wavelet domain illustration shows the FIG. 1A chirp signal as a wavelet decomposition where the time domain signal is decomposed into different frequency bins from lowest to highest frequency. This frequency decomposition can be used and adapted with one aspect of the invention to determine/select and operate frequency dependent transmitters so a resulting system can produce an exemplary chirp signal or other complex signal within a desired broad range with acceptable or limited signal degradation. An embodiment of the invention uses filtering in a wavelet domain in order to reduce a number of frequencies required to function over a selected broader range, produce a desired complex waveform, and create desired output quality. In this example presented herein, a desired approximation of a chirp signal from 10 Khz to 1 Mhz can be produced with only four discrete piezoelectric transmitters. In this example, four discrete transmitters, e.g., narrow band emitters, were selected which combine their outputs to produce a broadband signal (or even an extremely broad band signal) based on elimination of frequency bins associated with frequencies that have a least impact on signal degradation emitted by a proposed emitter system and adversely impacted physical design (e.g., lower frequencies require much larger resonators in an acoustic example; for an RF example, lower frequencies require larger antenna segments). In this example, four frequency bins emitted with four narrow band emitters oriented to recreate a desired broadband signal of FIG. 1A with acceptable degradation. Frequency bins whose removal results in negligible or minimal degradation of a recreated FIG. 1A chirp are removed and thus eliminate a need for a narrow band emitter to emit that removed frequency bin. In this example, the removed frequency bins would have required the largest resonators/emitters of the total resonators required to produce a recreated result with zero degradation thus substantially reduce cost and optimize other final design parameters (e.g., size).

A first step in a method of design or manufacturing in accordance with one embodiment of the invention is determining an order or size (e.g., number of cycles used in a wavelet frequency transform) of a wavelet transform required to perform a second step of an exemplary embodiment of the invention. A second step can be performing a wavelet transform on an input waveform based on first step determined order or size. Order or size of a wavelet transform used with an embodiment of the invention can be determined based on several wavelet transform order/size factors, e.g., two factors. Exemplary factors include a target sampling rate and maximum available frequency bins used with the wavelet transform. Maximum available frequency bins can be determined based on design constraints and/or total time duration of a signal of interest e.g., an input waveform such as described in more detail below.

For example, a first factor for determining wavelet transform order/size is determining a target sampling rate, as the sampling rate determines a highest frequency of interest. A resulting exemplary system would filter any frequencies higher than the highest frequency of interest. Using the Nyquist criteria, a selected sampling rate would be ½ of 1/sample rate.

A second factor for wavelet transform order/size determination could be number of frequency bins and order of a selected wavelet transform based on a preliminary frequency bin analysis. One example of a preliminary frequency bin analysis can include starting with a known or selected overall signal duration time span and a sample rate where the time span is divided by the sample rate to give the number of samples over the stated signal duration. $2^N$=number of samples thus N can be determined where N is the number of preliminary frequency bins as well as order of a selected wavelet transform.

Alternatively, a preliminary frequency bin analysis can be based on a determination of a preliminary reduced number of wavelet frequency bin/octaves as determined by an octave/frequency bin reduction analysis. For example, a preliminary octave/frequency bin reduction analysis can start with determining a maximum possible number of usable octaves/frequency bins in view of design constraints (e.g., the number of times a highest frequency of interest will be divided by half successively to reach a preliminary number of emitters which can be used while meeting all design constraints e.g., size, power, etc) below the selected highest frequency. In other words, an analysis which determines a maximum number of emitters which then in turn drives octave/frequency bin reduction and determination as well as resulting size (i.e., frequency bin) and order of a wavelet transform. Sample rate can be set at twice the highest frequency of interest if a designer has the freedom to set such a sample rate.

A second step in accordance with one embodiment of the invention includes performing a wavelet transform on an input waveform based an order or size (e.g. frequency bins) of a wavelet transform determined in step 1 (e.g., N).

A third step in accordance with one embodiment of the invention includes determination of filtering in a wavelet domain where selected filters are determined based on an analysis of each frequency bin's contribution to recreating the input waveform that was fed into the wavelet transform at the second step. Any frequency bin that provides minimal contribution can be deleted or removed from a system designed using an exemplary process in accordance with one embodiment of the invention. For example, removal can include removal of a transmitter or antenna segment for the deleted or removed frequency. For example, an exemplary system inputs the wavelet transform output from the second step, select a frequency bin, zero out coefficients associated with the selected frequency bin, then perform an inverse wavelet transform on a modified wavelet transform output from the second step including coefficients from the selected frequency bin zeroed out in order to generate a resulting modified waveform to compare with the original input waveform. Next, a processing system then determines differences between the resulting modified waveform with the original input waveform in view of design constraints on maximum differences allowable between the original input waveform and the resulting modified waveform. Where such differences do not exceed allowable degradation constraints, the selected frequency bin is then identified as a candidate for removal and thus results in removal of an emitter from a candidate design for generating an optimized or modified version of the original input waveform. This third step is repeated for each frequency bin or octave.

FIGS. 2 and 3 respectively show examples of wavelet transforms used with an example of the invention showing a before and after result. FIG. 2 shows an exemplary wavelet domain techniques on an original input waveform used in one example embodiment of the invention. Using the filtering techniques discussed herein, a number of frequency bins needed to adequately reproduce the original signal can be reduced as shown in FIG. 3 using wavelet domain filtering as discussed herein.

Referring to FIG. 2 results of one example of a wavelet transform of an original input waveform is shown. FIG. 3 shows how the wavelet transform results would appear after filtering e.g., zeroing out selected coefficients (e.g., first and fifth table entries under Fourth Pass). Both FIGS. 2 and 3 show an example of a utilization of a sixteen point wavelet transform of sin(x)/x. A system adapted in accordance with one aspect of the invention uses an initial calculation of $N=\log_2$ (number of samples). For example, a system could takes $\log_2$*(number of sample points), in this case $N=\log_2(16)=4$, passes N to calculate a wavelet transform.

Referring to FIG. 2, a first column shows a time value t for sampling activities. An upper section of FIG. 2 defines parameters used of F=omega/2 pi where omega is frequency for a selected waveform signal as well as delta t=a defined sample rate (in this case 0.0002 sec). The second column for FIG. 2 shows omega used in the third column calculation. A third column of FIG. 2 shows a calculation result for F(x)=sin x/x where x is omega*t. For a first pass shown in column four, averages of sequential pairs from the third column are taken. A first two sequential pair elements of the third column F(x) signal calculation are 0 and 0.63661977. An average of each two sequential elements of calculation results of F(x) shown as third column values are stored as a first element of a first pass, as 0.31831. The next two sequential elements of the third column F(x) will be −1,023e −16 and −0.2122066. An average of these two sequential numbers is placed in a second element of the first pass as −0.1061. Similar calculations and processing is continued for all eight pairs of the sixteen elements of the signal F(x) values from the third column and in such a manner the first eight elements of the first pass (fourth column) will be populated in the FIG. 2 table.

Referring to FIG. 2, a second eight elements of the first pass will be made up of deviations. A deviation represents a wavelet transform computation element. Deviation calculations for the first pass commences by receiving the first element of the first pass from the fourth column and subtracting the first of the two sequential element numbers that were averaged to obtain the first element of the first pass in the fourth column (i.e., first pass first element of 0.31831—first element of calculation results of F(x) 0=0.31831) and place this result into the ninth element of the first pass. The tenth element of the first pass will thus be −0.1061−(−1.024e−16)=−0.1061. The eleventh element will be 0.063662−1.0236e−16=0.063662. Processing will continue in a similar manner until all sixteen elements of the first pass are computed and stored. The last eight elements of the first pass are copied across to the last eight elements of a second, third, and fourth pass. These first pass deviations represent desired wavelet coefficients of a highest frequency which is ½ of 1/sample rate, in this example 2.5 KHz.

Referring to FIG. 2, the second pass calculations shown in the fifth column are calculated in much the same way as a first eight for the first pass were calculated except that only a top eight elements will be calculated as a bottom eight deviations were copied over as a second eight elements for each second, third, and fourth pass. A first element of a second pass will be an average of a first two elements of the first pass or 0.31831 and −0.1061 which results in 0.106103 placed in the fifth column of the data structure or table of FIG. 2 for the first element of the second pass. Third pass calculation processing will continue using the pairs of sequential elements of the first pass and so the first four elements of the second pass will be determined and stored. For a next four elements of a second pass, elements five through eight, a processing system will calculate the second pass deviations. A first second pass deviation calculation will take the first element of the second pass and subtract the first element of first pass then place the subtraction result output in a fifth element of the second pass. Next, take the next second element of a second pass minus the third element of a first pass and store this result in a sixth element of a second pass. Next, take the third element of second pass minus the fifth element of the first pass and store this result in a seventh element of the second pass. Next, take the fourth element of second pass minus the seventh element of the first pass and store this result as the fourth element of second pass. Now an exemplary system can copy elements five through eight of the second pass into elements five through eight of the third and fourth pass. These deviations for the second pass represent the wavelet coefficients of the next lower frequency, in this case 1.25 KHz. Note a resolution at this frequency is half that of the higher frequency (half as many wavelet coefficients).

Referring to FIG. 2, the third pass computations are done in a similar same way as the other passes except that only the top four elements (of the third pass column of elements) need to be filled in since the rest have already been filled in with the deviations from earlier passes. The first element of third pass is an average of the first and second elements of second pass and the second element of the third pass is an average of the third and fourth element of the second pass. The third element is the deviation or first element of third pass minus the first element of the second pass and the fourth element of third pass is the second element of third pass minus the third element of second pass. Next, a design system would copy the two deviations, elements three and four of third pass to elements three and four of fourth pass. Results of the third pass represent the next lower frequency of 625 Hz.

Referring to FIG. 2, now the fourth pass only has two elements not filled in the first and second pass. The first element of the fourth pass is an average of the first and second elements of third pass and the second element is a deviation, first element of fourth pass—first element of third pass. The second element of fourth pass represents the next lower frequency of 312.5 Hz. The first element of fourth pass represents a lowest frequency i.e., a non-changing DC component of a waveform signal.

Figure 6:
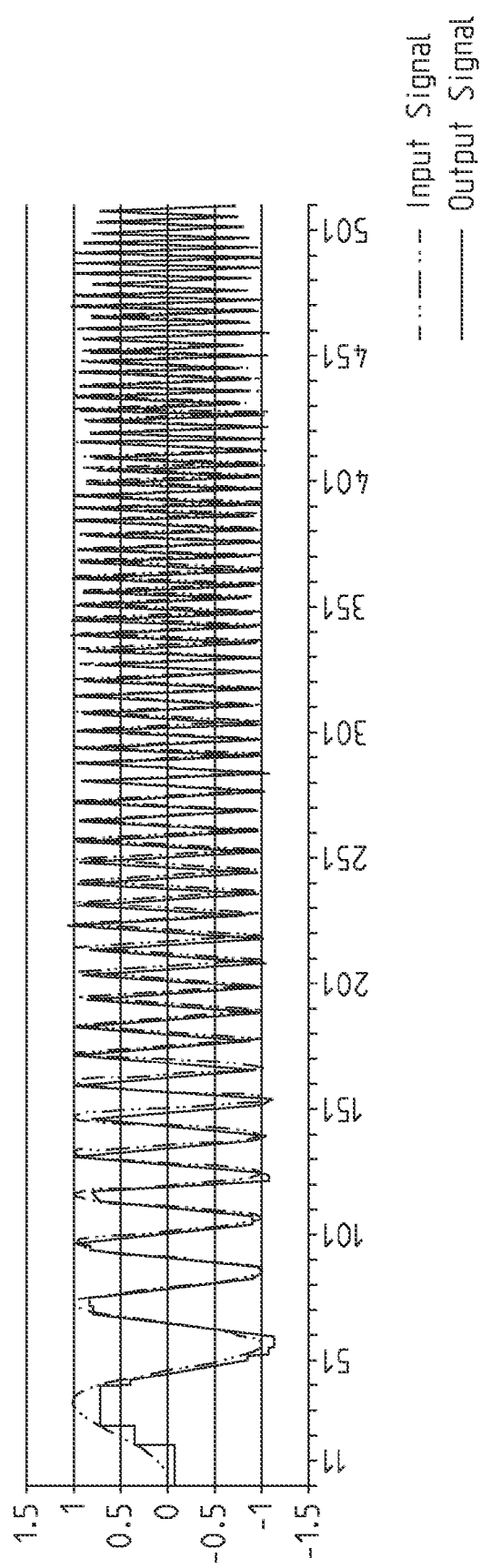
FIG. 6 shows waveform comparison results between an input waveform and a different filtered output waveform (e.g., frequency bin selections and removals) with different values used to graphically show degradation analysis through a graphical display of degree of differences between the two waveforms.

FIGS. 4, 5, and 6 show results between an input waveform and a filtered output waveform with different values (e.g., A, B, and C as discussed below) and filtering approaches. A determination of exemplary third step filtering in the wavelet domain, as shown in FIGS. 4, 5, and 6, can be based on 1) a single coefficient, 2) a group of coefficients in the same frequency bin, or 3) a set of coefficients affecting the same input waveform time period. If x is an original single, group, or set coefficient associated with an input waveform and f(x) is a filtered single, group, or set coefficient, then two exemplary types of filtering in the wavelet domain can include: First Type using a proportional with a constant offset approach; and a Second Type using a threshold where if a constant C is above a value, then coefficients are unchanged; of less than threshold then set to zero. In other words, Second Type includes a determination that if a selected coefficient's absolute value is less than a constant C, the set selected coefficients to zero; otherwise leave selected coefficient unchanged.

In particular, First Type: fx=Ax+B; Second Type: if [absolute value](x)<C then fx=0, otherwise fx=x. In the First Type, if A=1 and B=0 then fx=x, if A=0 and b=0 then fx=0, If A is greater than one then the effect of that coefficient is amplified. One reason for having B as non-zero would be for applying to the DC component to change the DC value. The Second Type approach can include setting small single, group, or set coefficients to zero to reduce a resulting number of filtered coefficients (and therefore reducing emitters at frequency ranges associated with the zeroed coefficients). In this example a goal is to reproduce the original input waveform signal within the frequencies of interest as close as possible while reducing the number of bins with non-zero coefficients, because if all the coefficients in a bin are zero, a transponder in that frequency range will not be required to reproduce the signal. For example, to perfectly reproduce the input waveform of FIG. 1A, a designer would require nine emitters/transponders, one each for a frequency of each bin. For example, ultrasonics used for corrosion control can be operable with frequencies from 10 KHz to 128 KHz. An exemplary initial step of an alternative embodiment of step 3 would be to find a highest value for Second Type value C that results in an acceptable chirp above 10 KHz. FIGS. 4-5 shows on example, e.g., C=0.3, and so these Figures show too much degradation is occurring. 10 KHz is at about the 3rd positive peak.

FIG. 5 shows behavior of one filtering embodiment with C=0.2 which, for the desired application and results which produced unacceptable degradation. This comparison shows the difference between input and modified output as determined by exemplary processing in accordance with an embodiment of the invention, e.g., steps one, two, and three discussed above.

FIG. 6 shows behavior of another filtering embodiment where C=0.1. This embodiment has acceptable degradation after the first three peaks. This comparison shows the difference between input and modified output as determined by exemplary processing in accordance with an embodiment of the invention, e.g., steps one, two, and three discussed above.

Figure 7:
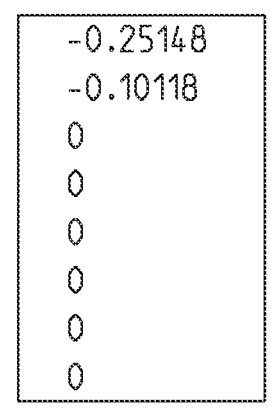

An alternative implementation of step 3 discussed above could be to analyze frequency bins that have only non-zero coefficients followed by zero or near zero coefficient in at least some subsequent frequency bins (of particular note where the non-zero coefficients are small). For example, referring to FIG. 7, the 4 KHz bin (shown with eight coefficients with two non-zero coefficients) meets this description as also shown below. Thus, an exemplary control system or user would attempt a setting A=0 for two coefficients associated with the 4 KHZ bin to zero out the entire frequency bin after noting the zero coefficients following the two non-zero coefficients (0.25148, 0.10118). Referring to FIG. 7, an embodiment tested herein sufficiently reproduces an original input waveform signal for values above 10 KHz. By following the above alternative implementation of step 3 for each frequency bin, a system or designer can reduce a number of transponders, in this case by half as the first five bins are now all zero when a starting position was ten frequency bins given five.

Figure 8:
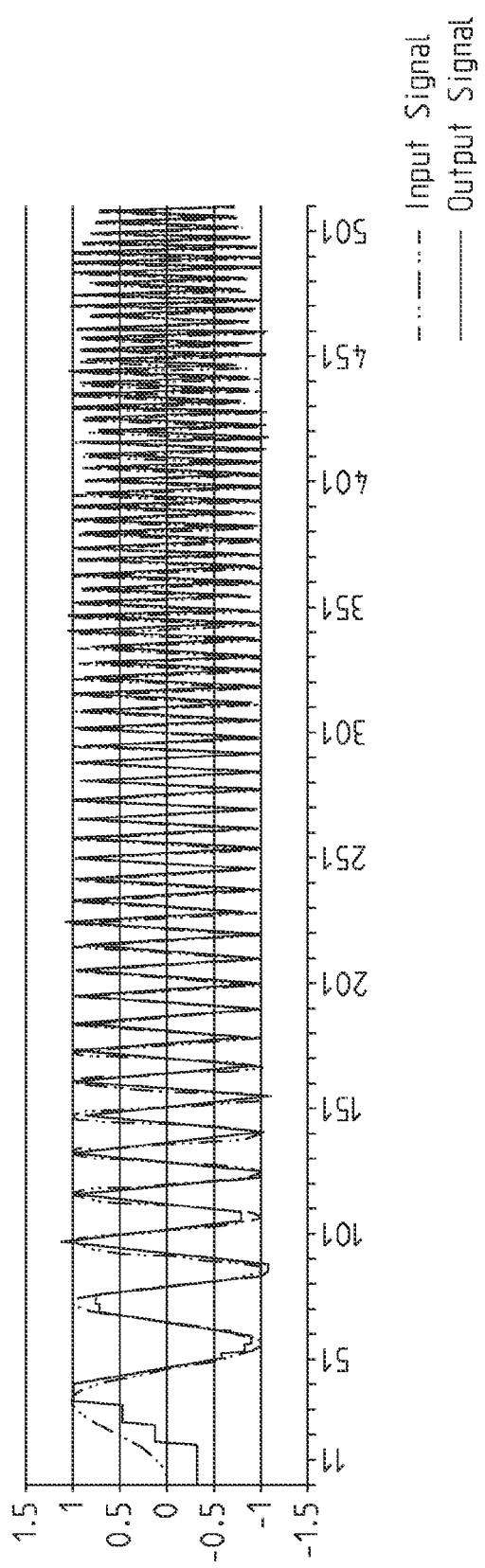
FIG. 8 shows waveform comparison results between an input waveform and a selected filtered output waveform (e.g., frequency bin selections and removals) producing an optimal result in view of a degradation analysis where emitters have been reduced to a maximum extent while ensuring differences between the two waveforms do not exceed limits on acceptable design criteria.

FIG. 8 shows an exemplary filtering embodiment with a plot of input signal to output signal. In particular, FIG. 8 shows waveform comparison results between an input waveform and a selected filtered output waveform (e.g., frequency bin selections and removals) which produce an optimal result in view of a degradation analysis where emitters have been reduced to a maximum extent while ensuring differences between the two waveforms do not exceed limits on acceptable design criteria. FIG. 8 shows application of the above referenced system and process whereby a number of emitters/ resonators associated with frequency bins associated with an original input waveform has been reduced to a maximum extent with acceptable, e.g., relatively little signal degradation, as shown by a difference between a filtered waveform result and a non-filtered waveform result. The FIG. 8 output also shows a design result where frequencies associated with design limitations are also filtered out e.g., low frequency.

Figure 9:
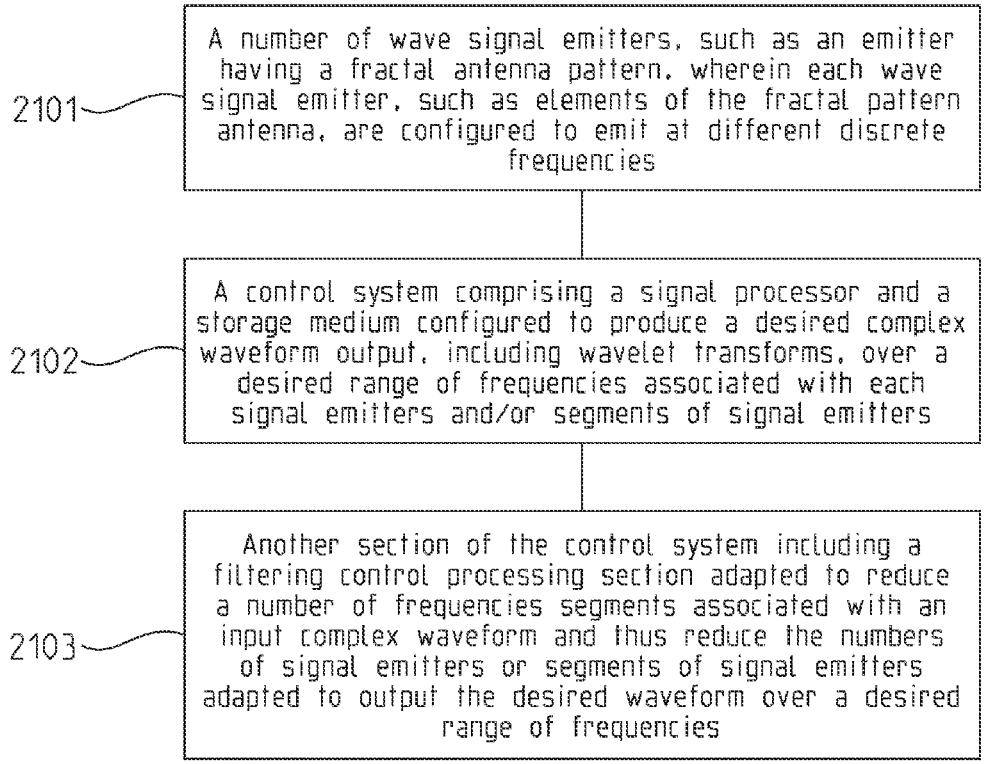
FIG. 9 shows a block diagram of an exemplary system of one embodiment of the invention.

FIG. 9 shows a block diagram of an exemplary signal emitter of the present invention. In one embodiment, pluralities of wave signal emitters are provided, such as an antenna having a fractal pattern, wherein elements of the fractal pattern are configured to emit at different discrete frequencies 2101. A fractal pattern is only exemplary; a plurality of wave signal emitters in accordance with an embodiment of the invention can have a variety of patterns capable of producing a desired output. An embodiment can further comprise a control system coupled to the wave signal emitters comprising a signal processor and a storage medium configured to produce a desired complex waveform, including wavelet transforms, over a desired range of frequencies associated with each signal emitters and/or segments of signal emitters 2102. A desired range of frequencies can be any set or subset of frequencies and can sometimes be octaves of one another. For example, sonic and ultrasonic frequencies can be used in addition to other frequencies. A control system, of course, can include more components than those listed for this embodiment, i.e., in addition to a signal processor and a storage medium. The exemplary control system 2102 can be further adapted to use filtering to reduce a number of frequencies and emitters or signal emitter elements associated with one or more antennas based on processing in accordance with one embodiment of the invention 2103. An exemplary embodiment of the invention can be adapted to dynamically apply filtering based on input design constraints, sensing receiver or transmitter antenna design constraints, environmental constraints e.g., jamming or network congestion or orientation of receiver/transmitter antennas, etc. An exemplary dynamic reduction of emitter or emitter segments while minimizing degradation can include an exemplary control system that can be adapted to use filtering processing to reduce a number of frequencies and thus reduce the signal emitters or segments of signal emitters adapted to output a desired waveform over a desired range of frequencies based on a plurality of design limitations. An exemplary control system can adapt filtering control processing based on frequency segmentation and reduction of emitter/emitter segments based on a plurality of determinations including a first determination of a size of a wavelet transform based on determining a sampling rate or setting a sampling rate and a second determination based on multiple filtered complex waveform comparisons based on frequency bin analysis, reduction of frequency bins for each different multiple filtered complex waveform, and comparisons of differences between a first input waveform and an each of the multiple filtered complex waveforms, wherein said control system selects an final output filtered waveform by selecting from one of the multiple filtered complex waveforms which have a least amount of differences in a predetermined frequency range, wherein the selected final output filtered waveform has a plurality of final bins, said plurality of final frequency bins are used to select said signal emitters or segments of signal emitters.

An exemplary filter is not limited and can include, for example, low-pass, high-pass, band-pass, etc. filters. An embodiment could further determine a size of a wavelet transform by determining a sampling rate or setting a sampling rate 2103. If a user is able to set a sampling rate, this can be done per an embodiment. Sometimes, it is desirable to determine the sampling rate. In another embodiment, a control system can determine a desired complex waveform based on frequency bin and amplitude of coefficients calculated from a given signal 2103. For example, during signal processing frequency bins and amplitudes of coefficients can be calculated and used to determine a desired complex waveform. The calculations for this embodiment are disclosed herein. In another example, a control system can produce a desired complex waveform over a desired range of frequencies 2103.

A desired range of frequencies is in no way limited by this disclosure. A desired range of frequencies can be any range.

In other embodiments, a plurality of wave signal emitters can be discrete piezoelectric emitters. In further embodiments, desired complex waveforms can be a chirp signal in a time domain; this exemplary waveform includes any form of a chirp signal. In another example, a control system can operate a plurality of transducers configured at discrete frequencies.

Figure 10:
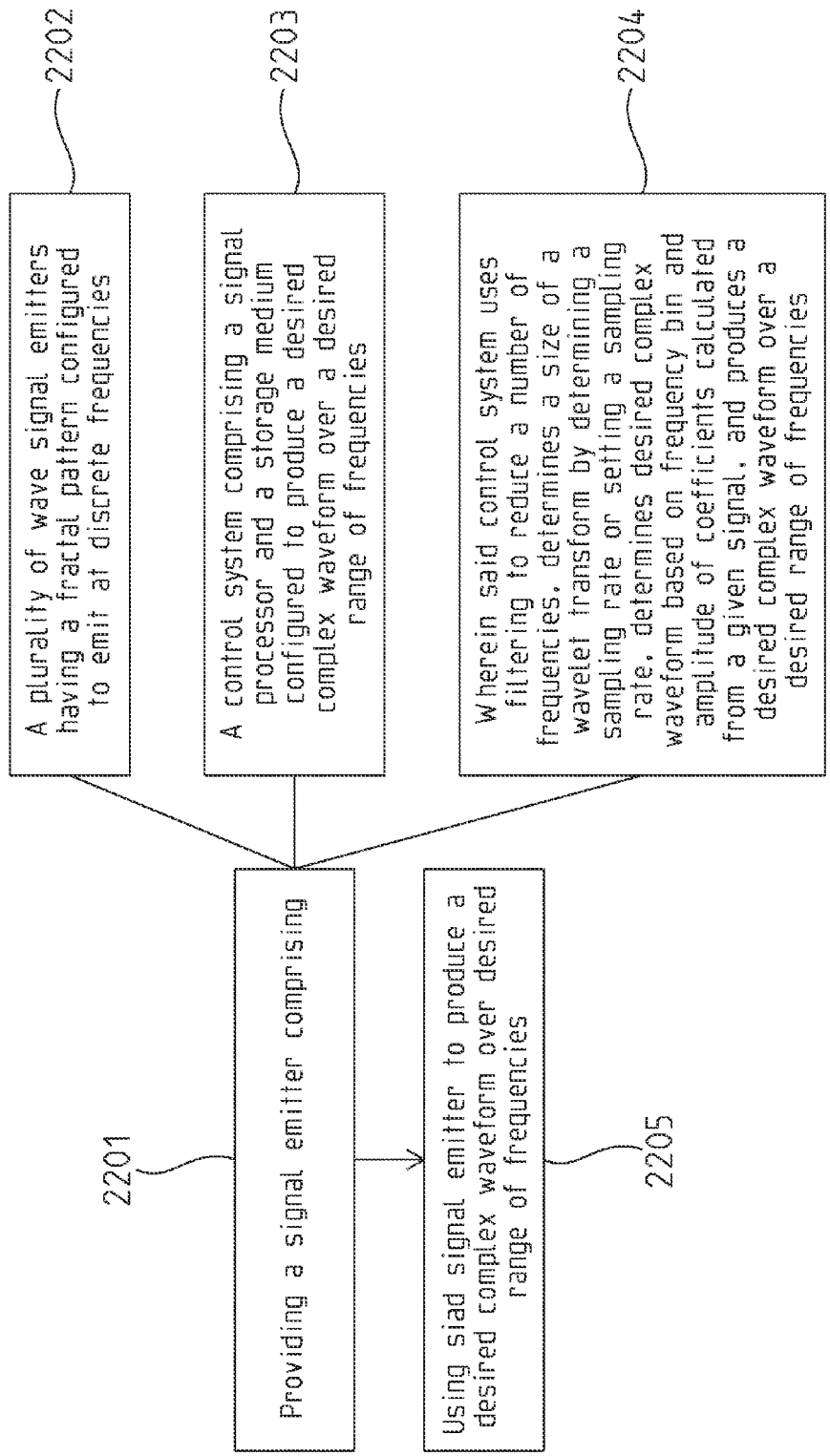
FIG. 10 shows a flow chart of an exemplary method of the present invention.

FIG. 10 shows a flow chart of an exemplary method of the present invention. In one embodiment, a method providing a signal emitter 2201 that can comprise a plurality of wave signal emitters 2202 having a fractal pattern configured to emit at discrete frequencies, a control system 2203 comprising a signal processor and a storage medium configured to produce a desired complex waveform over a desired range of frequencies, and wherein said control system 2204 uses filtering to reduce a number of frequencies, determines a size of a wavelet transform by determining a sampling rate or setting a sampling rate, determines desired complex waveform based on frequency bin and amplitude of coefficients calculated from a given signal, and produces a desired complex waveform over a desired range of frequencies. An embodiment can also use a signal emitter 2205 to produce a desired complex waveform over a desired range of frequencies.

In another embodiment, a plurality of wave signal emitters can be piezoelectric emitters. In one example, a desired complex waveform can be a chirp signal. In one embodiment, a control system can operate a plurality of transducers that can be configured at discrete frequencies.

Figure 11:
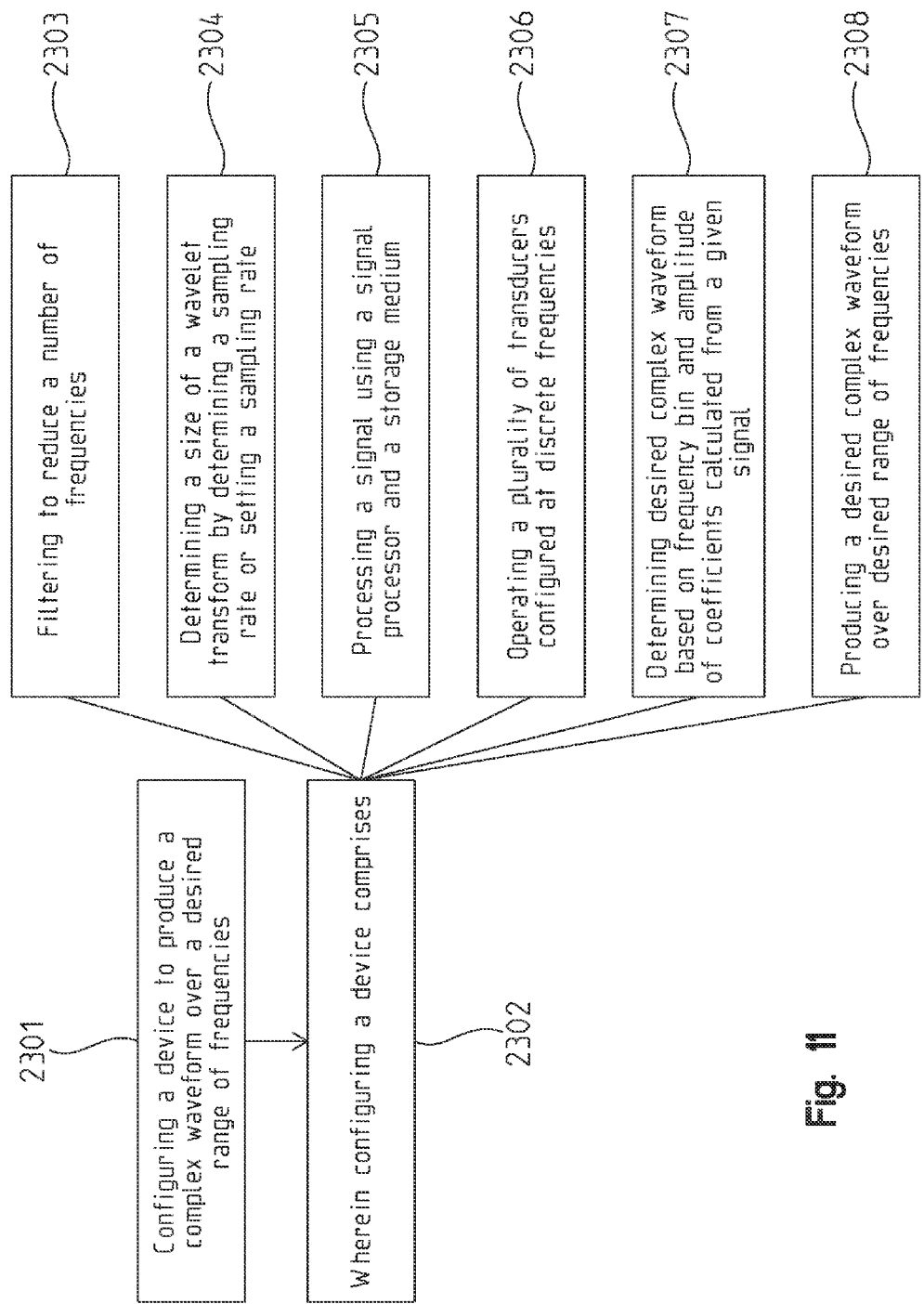
FIG. 11 shows a flow chart of an exemplary method of the present invention.

FIG. 11 shows a flow chart of an exemplary method of the present invention. In one embodiment, a method comprises configuring a device 2301 to produce a complex waveform over a desired range of frequencies. In another embodiment, a method can include a filtering 2303 to reduce a number of frequencies. In one embodiment, a method can include determining 2304 a size of a wavelet transform by determining a sampling rate or setting a sampling rate. In yet another embodiment, a method can processes 2305 a signal using a signal processor and a storage medium. In one example, a method operates 2306 a plurality of transducers configured at discrete frequencies. In one embodiment, a method can include determining 2307 desired complex waveform based on frequency bin and amplitude of coefficients calculated from a given signal. In another embodiment, a method can produce 2308 a desired complex waveform over desired range of frequencies.

Figure 12:
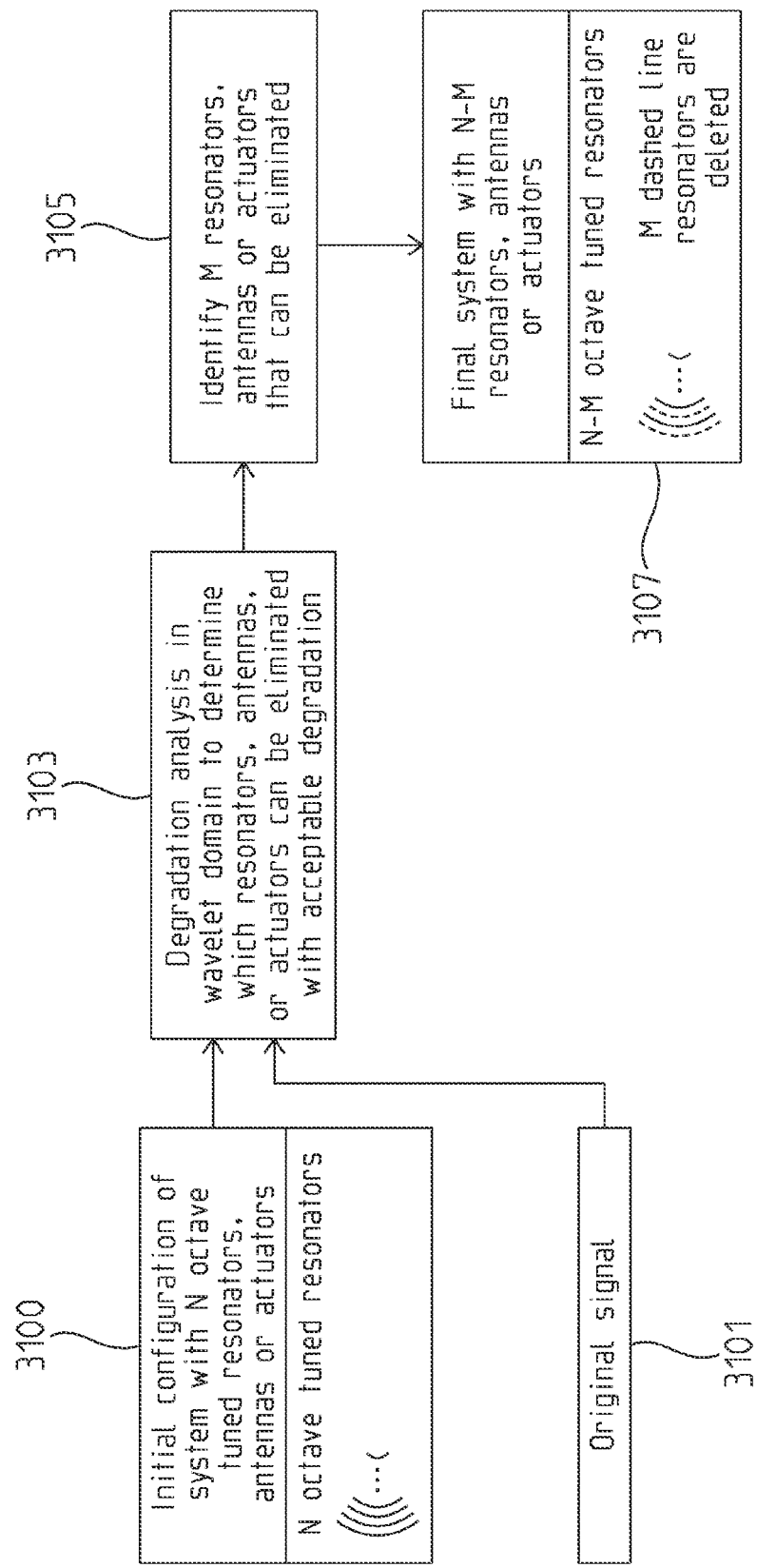
FIG. 12 shows another exemplary process in accordance with one embodiment of the invention.

FIG. 12 shows another exemplary process in accordance with one embodiment of the invention. In particular, FIG. 12 shows a step of creating an Initial Configuration of Emitter Systems 3100 with N octave differently tuned resonators, antennas or actuators. A next step of conducting a Degradation Analysis Step 3103 is conducted which receives data describing the Initial Configuration of Emitter Systems 3100 and an original input waveform signal 3101 and conducts a degradation analysis in a wavelet domain to determine which resonators, antennas, or actuators can be eliminated with acceptable degradation. An output of the Degradation Analysis Section Step 3103 is then used at Element Identification and Deletion Step 3105 to identify M resonators, antennas, or actuators that can be eliminated while meeting predetermined design criteria based on Degradation Analysis Section 3103. Next, a Final System Determination Step 3107 is executed based on inputs from the Element Identification and Deletion Step 3105 where a final system implementation design with N-M octave tuned resonators, antennas, or actuators.

Figure 13:
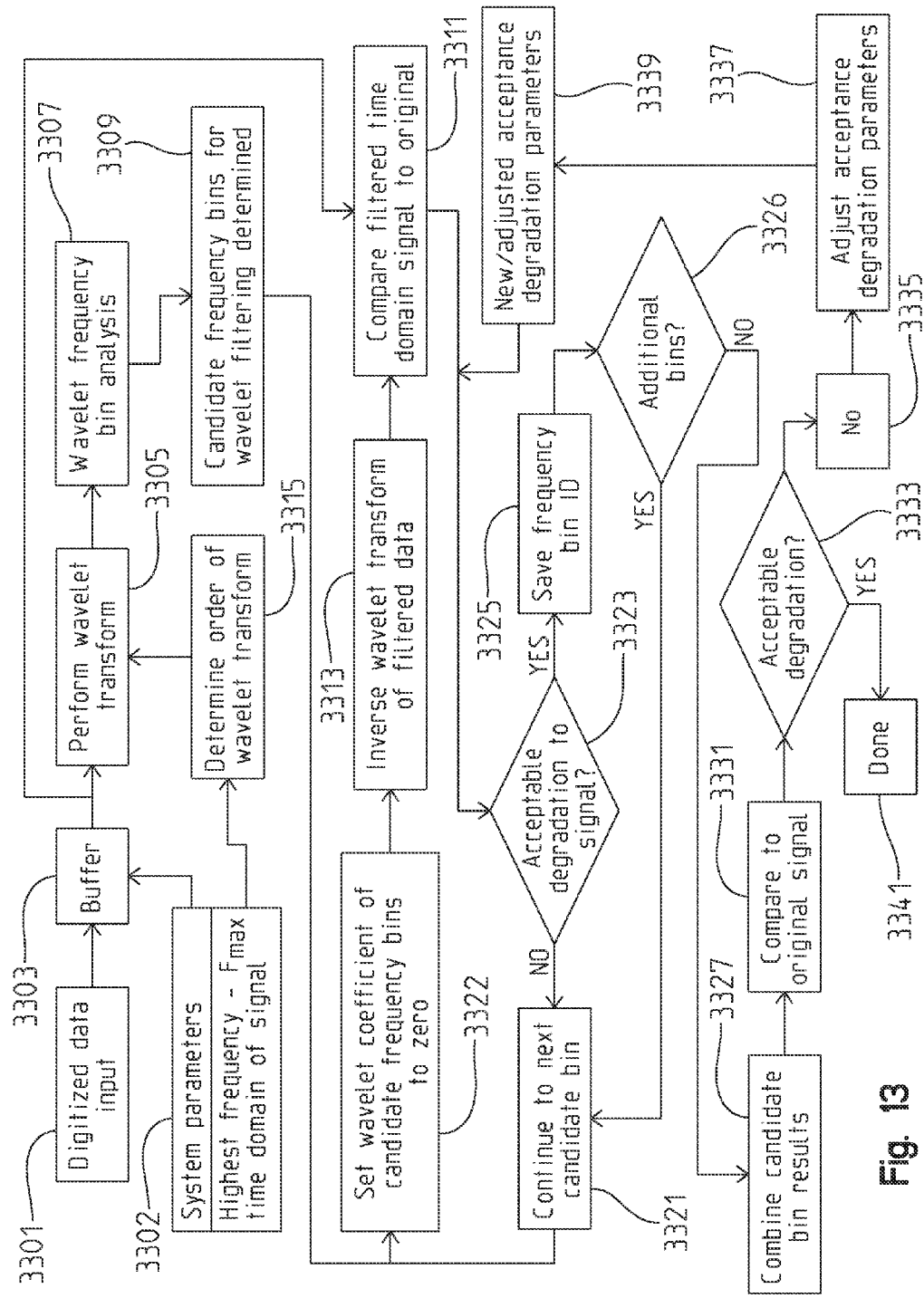
FIG. 13 shows another exemplary process in accordance with one embodiment of the invention.

FIG. 13 shows another exemplary process in accordance with one embodiment of the invention. Digitized Data Input (e.g., original waveform signal prior to wavelet transform and filtering to reduce signal emitters) is generated at Step 3301. A System Parameter List is generated at 3302 (e.g., Highest Frequency Fmax and Time duration of Signal). A Buffer is configured by the System Parameter List and the Buffer receives the Digitized Data Input at Step 3303. Wavelet Transform Order (N) is determined at Step 3315 based on input of System Parameters from Step 3302 and Buffer information generated at Step 3303. Wavelet Transform Processing is performed at Step 3305 based on input of Buffer data from Step 3303 and Wavelet Transform Order (N) determine at Step 3315. Wavelet Frequency Bin Analysis is performed at Step 3307 based on input from Wavelet Transform Processing from Step 3305. Candidate Frequency Bin Determination for Wavelet Filtering is determined at Step 3309 based on input from Wavelet Frequency Bin Analysis at Step 3307. Wavelet Coefficient Zeroing of candidate frequency bins are conducted at Step 3322 based on inputs from Step 3309 Candidate Frequency Bin Determination for Wavelet Filtering. Inverse Wavelet Transform of Filtered Data is performed at Step 3313 based on inputs from Step 3322. Comparison of Filtered Time Domain Signals to Original Digitized Data Input 3301 at Step 3311 based on input from Step 3313 and Step 3303. An Acceptable Degradation to Original Waveform Signal (e.g., 3301) decision or determination is made based on input from Step 3311 where the determination is made by comparing differences between the Filtered Time Domain Signal and Original Waveform Signal and finding such differences to not exceed predetermined limits including the System Parameters 3302. At Step 3323, if a Yes, Acceptable, determination is made, then processing continues at Step 3325 where a Frequency Bin ID is saved indicating a selected Filter Bin is desired for retention in a final implementation design. At Step 3332, if a determination is "No", Not Acceptable, then processing continues as Step 3321 which is Continue to Next Candidate Bin which returns processing to Step 3322 to loop through 3313, 3311 and back to Step 3323 for another Acceptability determination or decision. From Step 3325, processing continues at Step 3326 which determines if Additional Bins are available for review where a "Yes" returns processing to Step 3321 and a "No" passes processing to Step 3327 which is Combines all Candidate Bin Results saved at Step 3325. Next, a Comparison to Original Signal is conducted at Step 3331 which compares a Candidate Composite Filtered Waveform produced from all Candidate Bin Results where a decision is made at Step 3333 on whether the Candidate Composite Filtered Waveform has acceptable degradation or not. If Step 3333 determines the Candidate Composite Filtered Waveform has acceptable degradation then processing completes and the Candidate Composite Filtered Waveform is designated as a Final Composite Filtered Waveform which then is used to eliminate emitters associated with an initial configuration of emitter systems. At Step 3333, if a determination is "No", Not Acceptable Degradation, then processing continues at Step 3337 which Adjusts Acceptable Degradation Parameters which alters Zero Wavelet Coefficients of Candidate Frequency Bins from Step 3322 in order to alter selection of frequency bins for zeroing in a loop including Steps 3322, 3313, 3311, 3323, and 3321. Next, New Acceptable Degradation Parameters are set at Step 3339 and processing continues at Step 3323 which continues as discussed above.

Although the invention has been described in detail with reference to certain preferred embodiments, variations and modifications exist within the spirit and scope of the invention as described and defined in the following claims.

The invention claimed is:

1. A signal emitter comprising:
a plurality of wave signal emitters configured to emit a final output filtered waveform at a plurality of discrete frequencies;
a control system coupled to and adapted to control said plurality of wave signal emitters comprising a signal processor and a storage medium configured to determine said final output filtered waveform over a desired range of frequencies associated with said plurality of wave signal emitters;
said control system configured to perform wavelet transforms to generate candidate solutions from which said final output filtered waveform is selected, wherein said final output filtered waveform selection is made in part by said control system based on filtering control processing comprising frequency segmentation;
wherein said filtering control processing comprises:
a first determination of a size of a wavelet transform based on determining a sampling rate;
a second determination based on multiple filtered complex waveform comparisons based on frequency bin analysis, reduction of frequency bins for each different multiple filtered complex waveform, and comparison of differences between a first input waveform and each of said multiple filtered complex waveforms;
wherein said control system selects said final output filtered waveform by selecting from one of said multiple filtered complex waveforms which have a least amount of differences in a predetermined frequency range; and
wherein said selected final output filtered waveform has a plurality of final frequency bins, output of said plurality of final frequency bins are respectively output to each of said plurality of wave signal emitters.

2. The signal emitter of claim 1, wherein said plurality of wave signal emitters are discrete piezoelectric emitters.

3. The signal emitter of claim 1, wherein said desired complex waveform is a chirp signal.

4. The signal emitter of claim 1, wherein said control system operates a plurality of transducers configured at a plurality of discrete frequencies.

5. The signal emitter of claim 1, wherein said control system determines a desired complex waveform based on frequency bins calculated from a given signal.

6. The signal emitter of claim 1, wherein said control system determines a desired complex waveform based on amplitudes of coefficients calculated from a given signal.

7. A method of design or manufacture comprising:
determining an order/size of a wavelet transform based on a plurality of wavelet transform order/size factors, wherein said plurality of wavelet transform order/size factors comprises:
determining a target sampling rate, wherein said target sampling rate determines a highest frequency of interest;
determining a number of frequency bins based on said target sampling rate;
determining an order of a selected wavelet transform based on a preliminary frequency bin analysis, wherein said frequency bin analysis is based on a determination of a preliminary reduced number of wavelet frequency bins as determined by a frequency bin reduction analysis;
performing a wavelet transform on an input waveform based on said determining an order/size of a wavelet transform step; and
determining filtering in a wavelet domain where selected filters are determined based on an analysis of each frequency bin contribution to recreating said input waveform that was input into said wavelet transform at said performing a wavelet transform step.

8. The method of claim 7, wherein said preliminary frequency bin reduction analysis comprises determining a maximum possible number of usable frequency bins below a selected highest frequency in view of design constraints.

9. The method of claim 7, wherein any frequency bin that provides minimal contribution can be removed from a system.

10. The method of claim 7, wherein a number of maximum available frequency bins is determined based on design constraints.

11. The method of claim 7, wherein a number of maximum available frequency bins is determined based on a total time duration of a signal of interest.

12. A method comprising:
configuring a device to produce a desired complex waveform over a desired range of frequencies associated with a plurality of wave signal emitters;
wherein configuring said device comprises:
configuring a control system to perform wavelet transforms over a desired range of frequencies;
using filtering control processing based on frequency segmentation to reduce a number of frequencies;
determining a size of a wavelet transform based on determining a sampling rate;
comparing multiple filtered complex waveforms based on frequency bin analysis, reduction of frequency bins for each different multiple filtered complex waveform, and comparison of differences between a first input waveform and each of said multiple filtered complex waveforms;
selecting a final output filtered waveform by selecting from one of said multiple filtered complex waveforms which have a least amount of differences m a predetermined frequency range; and
using a plurality of frequency bins to select said plurality of wave signal emitters.

13. The method of claim 12, wherein said plurality of wave signal emitters are discrete piezoelectric emitters.

14. The method of claim 12, wherein said desired complex waveform is a chirp signal.

15. The method of claim 12, wherein said control system operates a plurality of transducers configured at a plurality of discrete frequencies.

16. The method of claim 12, wherein said control system determines a desired complex waveform based on frequency bins calculated from a given signal.

17. The method of claim 12, wherein said control system determines a desired complex waveform based on amplitudes of coefficients calculated from a given signal.

18. The method of claim 12, wherein said control system comprises a signal processor and a storage medium configured to produce a desired complex waveform over a desired range of frequencies associated with said plurality of wave signal emitters.

19. The method of claim 12, wherein said wavelet transforms are performed based on a plurality of wavelet transform order/size factors, wherein said plurality of wavelet transform order/size factors comprises:

determining a target sampling rate, wherein said target sampling rate determines a highest frequency of interest;

determining a number of frequency bins based on said target sampling rate;

determining an order of a selected wavelet transform based on a preliminary frequency bin analysis, wherein said frequency bin analysis is based on a determination of a preliminary reduced number of wavelet frequency bins as determined by a frequency bin reduction analysis.

20. The method of claim 12, wherein using filtering control processing comprises determining filtering in a wavelet domain where selected filters are determined based on an analysis of each frequency bin contribution to recreating an input waveform that was input into said wavelet transform.

* * * * *